(12) United States Patent
Chen et al.

(10) Patent No.: US 7,857,468 B2
(45) Date of Patent: Dec. 28, 2010

(54) ANTIGLARE FILM AND METHOD OF FORMING THE SAME

(75) Inventors: Ming-Huei Chen, Taoyuan County (TW); Chang-Jian Weng, Chiayi (TW); Chin-Sung Chen, Taoyuan (TW); Shih-Pin Lin, Taipei (TW)

(73) Assignee: BenQ Materials Corporation, Gueishan, Tao-Yuan Hsien (TW)

( * ) Notice: Subject to any disclaimer, the term of this patent is extended or adjusted under 35 U.S.C. 154(b) by 218 days.

(21) Appl. No.: 12/272,755

(22) Filed: Nov. 17, 2008

(65) Prior Publication Data
US 2010/0027126 A1   Feb. 4, 2010

(30) Foreign Application Priority Data
Jul. 31, 2008   (TW) ............... 97128976 A

(51) Int. Cl.
*G02B 1/11*   (2006.01)
*B05D 5/06*   (2006.01)
(52) U.S. Cl. ................... 359/601; 428/317.9
(58) Field of Classification Search ............ 359/599, 359/601
See application file for complete search history.

(56) References Cited
U.S. PATENT DOCUMENTS 3,642,675 A * 2/1972 McKenzie ............ 523/219
3,904,560 A * 9/1975 McKenzie ............ 106/253
6,217,176 B1   4/2001 Maekawa
2007/0076298 A1   4/2007 Murata et al.
2007/0268587 A1   11/2007 Ninomiya et al.
2007/0285788 A1 * 12/2007 Yeh et al. ............ 359/601
2008/0030861 A1   2/2008 Ookubo et al.
2009/0128915 A1 * 5/2009 Weng et al. .......... 359/601
2009/0191406 A1 * 7/2009 Yoneda et al. ........ 428/336
2010/0060142 A1 * 3/2010 Itou et al. ............ 313/498
2010/0068504 A1 * 3/2010 Lin et al. ............. 428/327
2010/0079869 A1 * 4/2010 Inoue et al. .......... 359/586

FOREIGN PATENT DOCUMENTS
JP   6-18706   1/1994
JP   2009119780 A *   6/2009

* cited by examiner

*Primary Examiner*—Mark Consilvio
(74) *Attorney, Agent, or Firm*—Winston Hsu; Scott Margo; Min-Lee Teng

(57) ABSTRACT

The present invention provides an antiglare film, which includes a transparent resin layer, a plurality of transparent hollow particles and a plurality of transparent solid particles. The hollow particles and the solid particles are distributed in the transparent resin layer, while the hollow particles are partially exposed thereon. The refraction index of the hollow particles and the refraction index of the solid particles are different from the refraction index of the transparent resin layer. Applying both the solid particles and the hollow particles mixed together can lead the antiglare film to have an excellent antiglare property, a high contrast and a great clarity.

22 Claims, 8 Drawing Sheets

| Ex. No. | Total haze (%) | Internal haze (%) | Transmittance(%) | Gloss | C/R value | Clarity |
|---|---|---|---|---|---|---|
| Ex. 1 | 13.0 | 8.36 | 91.40 | 61.20 | 1384 | 187.5 |
| Ex. 2 | 9.49 | 5.27 | 91.00 | 68.54 | 1208 | 174.0 |
| Comparative Ex. 1 | 9.10 | 3.58 | 90.95 | 63.32 | 1133 | 120.0 |
| Comparative Ex. 2 | 20.29 | 5.42 | 90.04 | 35.58 | 918 | 98.0 |

FIG. 7

ANTIGLARE FILM AND METHOD OF FORMING THE SAME

BACKGROUND OF THE INVENTION

1. Field of the Invention

The present invention relates to an antiglare film and the related forming method, and more particularly, to an antiglare film suitable for being applied to a high fine display device and the related forming method.

2. Description of the Prior Art

As shown in FIG. 1, a conventional antiglare film 12 is usually formed through dispersing transparent particles 14 in a transparent resin 16. The transparent resin 16 and the transparent particles 14 having approximate refractive indexes are mixed and then coated on a substrate 10, and are cured to form an optical film 12. The transparent particles 14 of the optical film 12 are partially exposed from the surface of the film to form a rough surface, causing light 18 to be scattered and refracted on the surface, and thus to achieve the antiglare effect. For example, as disclosed in Japanese Patent Publication No. 6-18706 silica particles are mixed into a resin and then coated on the surface of a transparent substrate to form a layer having concaves and convexes thereon. An antiglare effect is attained when light beams are diffused by the concave and convex surface. However, there is only external light diffusion presented in such method, and the internal light diffusion seldom appears. Accordingly, an antiglare film having both the internal diffusion ability and the external diffusion ability is developed by utilizing different amounts of two different types of particles with different sizes and refractive indexes. For example, in U.S. Pat. No. 6,217,176 B1, light-transparent fine particles having two different refractive indexes are mixed in a resin. The difference of refractive index between the two types of light-transparent fine particles and the light-transparent resin is between 0.03 and 0.2, and the light transparent fine particles have a particle size within a range of about 1 to 5 micrometers (µm).

Although the prior antiglare film can reduce shortcomings of glare and dazzling, optical properties of the antiglare film, such as the haze value, gloss, and clarity are limited by the prior art. It is still a challenge to improve the optical effects of the antiglare film.

SUMMARY OF THE INVENTION

It is therefore a primary object to provide an antiglare film and the related forming method to improve the antiglare effect, the contrast and the clarity at the same time.

According to the claimed invention, the antiglare film includes a transparent resin layer, a plurality of solid particles and a plurality of hollow particles. The hollow particles and the solid particles are both distributed in the transparent resin layer, and the hollow particles are partially exposed from the transparent resin layer. The refractive index of the solid particles is different from that of the transparent resin layer. The total haze value of the antiglare film is between 3% and 25% by mixing the solid particles and the hollow particles.

Furthermore, the present invention provides a method to make an antiglare film. First, a resin coating solution is provided. Subsequently, a plurality of solid particles and a plurality of hollow particles are added into the resin coating solution to form an antiglare coating solution, where the solid particles and the hollow particles are transparent. Thereafter, the antiglare coating solution is spread on a transparent substrate. Next, a curing process is performed to turn the resin coating solution into a transparent resin layer so that an antiglare film is formed, where the total haze value of the antiglare film is between 3% and 25%.

Additionally, according to embodiments of the present invention, a 60° gloss value of the antiglare film can be within a range from 40% to 90%, the outer haze value can be within a range from 0 to 6%, and the clarity can be larger than 150.

Compared to the prior art, the present invention adds both the solid particles and the hollow particles in the transparent resin layer, so the structural difference between the fine particles, and different refractive indexes of the materials in the antiglare film result in the light scattering, diffraction, refraction, and reflection. Therefore, the antiglare film can have the characteristics of antiglare, high contrast, and high clarity.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 shows a data table of test results for the examples according to the present invention and the comparative examples.

DETAILED DESCRIPTION

Figure 1:
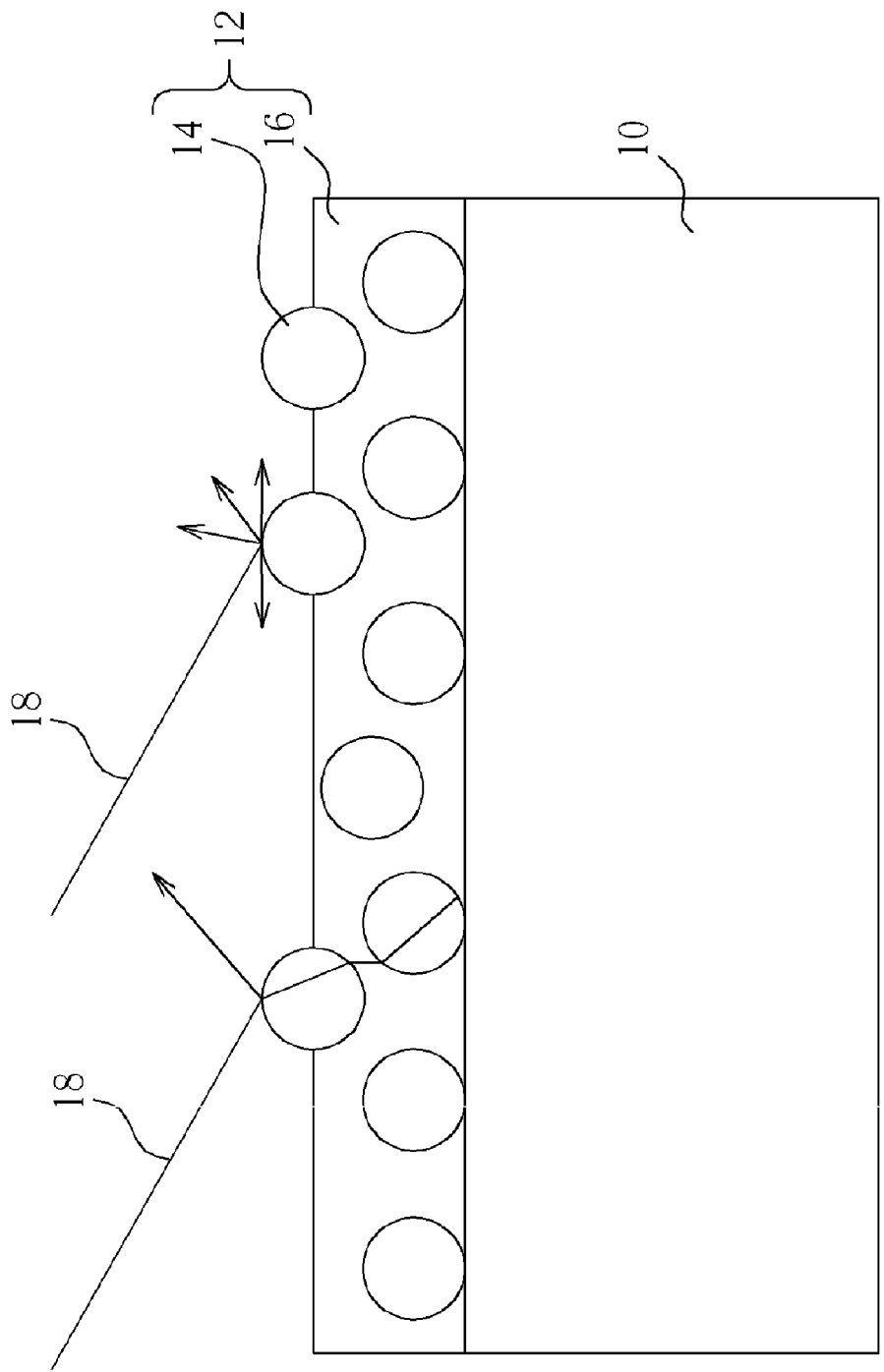
FIG. 1 is a schematic cross-sectional view of a conventional antiglare film.
Figure 2:
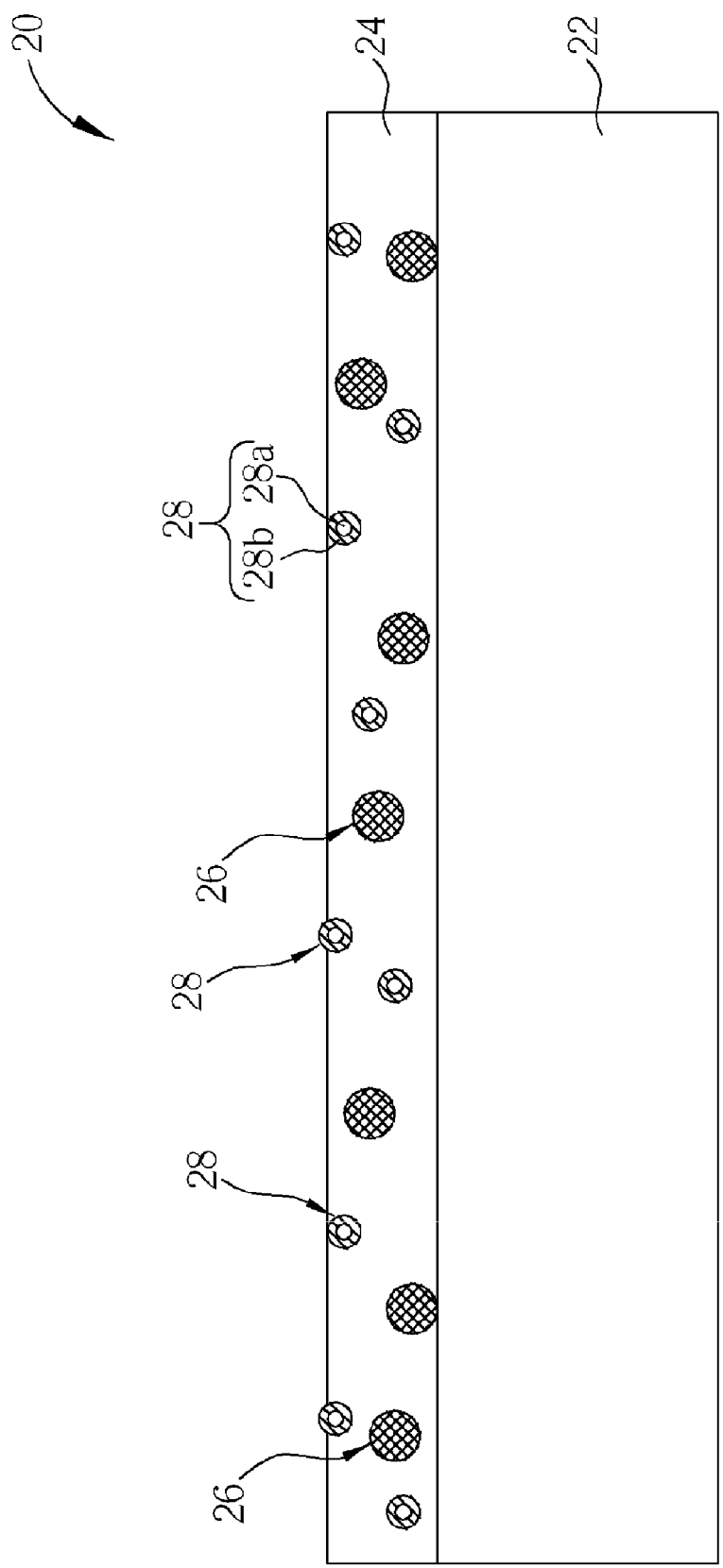
FIG. 2 is a schematic cross-sectional view of an antiglare film according to a preferred embodiment of the present invention.

FIG. 2 shows a schematic cross-sectional view of an antiglare film according to a preferred embodiment of the present invention. As shown in FIG. 2, a substrate 22 is covered with an antiglare film 20. The antiglare film 22 includes a cured transparent resin layer 24, a plurality of transparent solid particles 26 and a plurality of transparent hollow particles 28.

The substrate 22 can include organic materials with high transparencies, such as TAC, polyethylene terephthalate (PET), diacetylenecellulose, cellulose acetate butyrate, polyether sulfone, polyacrylic resin, polyurethane resin, polyester, polycarbonate, polysulfone, polyether, polymethyl pentene, polyether ketone, polymethacrylonitrile, and so on. The substrate 22 can be a film having a thickness of for example 25 µm to 300 µm.

The thickness of the transparent resin layer 24 can be substantially within a range from 2 µm to 20 µm. It can be a hard coating layer, such as an UV light curable transparent resin layer, which preferably includes an acrylic functional group. The examples of the resin layer may be preferably polyester resins, polyether resins, acrylic acid resins, epoxy resins, urethane resins, alkyd resins, spiro acetal resins, polythiol-polyene resins, polybutadiene resins, and so on, which has an acrylic functional group and a low molecular weight.

The solid particles 26 can be widely distributed in the transparent resin layer 24, and the diameter of the solid particles 26 is substantially within a range from 1 µm to 10 µm. The ratio of the diameter of the solid particles 26 to the thickness of the transparent resin layer 24 can be substantially within a range from 0.15 to 1, but should not be limited thereto. In regard to the whole antiglare film 20, the weight percentage of the solid particles can be substantially between 0.1% and 5%, and preferably between 0.5% and 1%. In a preferred case, the distribution of the solid particles 26 is closer to the substrate 22 than the distribution of the hollow particles 28, so as to provide more interfaces for internal light diffusions or internal scatterings. The solid particles 26 can include an acrylic resin, polystyrene, an acrylic-carbonate copolymer, a copolymer thereof, a derivative thereof, a mixture thereof, or an inorganic oxide compound.

Each hollow particle 28 can include a hollow part 28a and a shell part 28b. The hollow particles 28 can be widely distributed in the transparent resin layer 24, and partially exposed from the transparent resin layer 24 to provide more interfaces for external light diffusions or external scatterings. The outside diameter of the hollow particles 28 can be substantially within a range from 1 µm to 10 µm, and the inside diameter thereof is substantially within a range from 0.5 µm to 8 µm. The hollow ratio of the hollow particles 28 is about 20% to 90%. The weight percentage of the hollow particles 28 to the antiglare film 20 is substantially within a range from 0.1% to 5%, preferably approximates 2%, and should not be limited thereto. The ratio of the outside diameter of the hollow particles 28 to the thickness of the transparent resin layer 24 is substantially within a range from 0.15 to 1.

The surfaces of the hollow particles 28 can be smooth, rough, or porous. When the hollow particles 28 are porous, it is preferred that the hollow particle has a specific surface area of 100 m²/g or more, to favor the dispersion in the transparent resin layer 24. The shell part 28b can include an acrylic resin, polystyrene, an acrylic-carbonate copolymer, polycarbonates, inorganic silicon oxide compounds, and so on. The hollow part 28a (or named as "the central portion of the hollow particle") of hollow particle 28 may be air or other gas, or in vacuum.

In the present invention, the refractive index of the solid particles 26 can be larger than that of the transparent resin layer 24, and can also be larger than or equal to that of the hollow particles 28. Accordingly, proper refractions occur at the interfaces to enhance the light diffusion. Preferably, the refractive index of the solid particles 26 and the refractive index of the hollow particles 28 can be smaller than 1.65 and larger than that of the transparent resin layer 24, while the refractive index of the transparent resin layer can be substantially larger than 1.45. For examples, the refractive indexes of the solid particles 26 and the hollow particles 28 can be about 1.55 to 1.59, and that of the transparent resin layer 24 can be about 1.51. In a preferred case, the refractive index of the solid particles 26 can be larger than that of the hollow particles 28.

Figure 3:
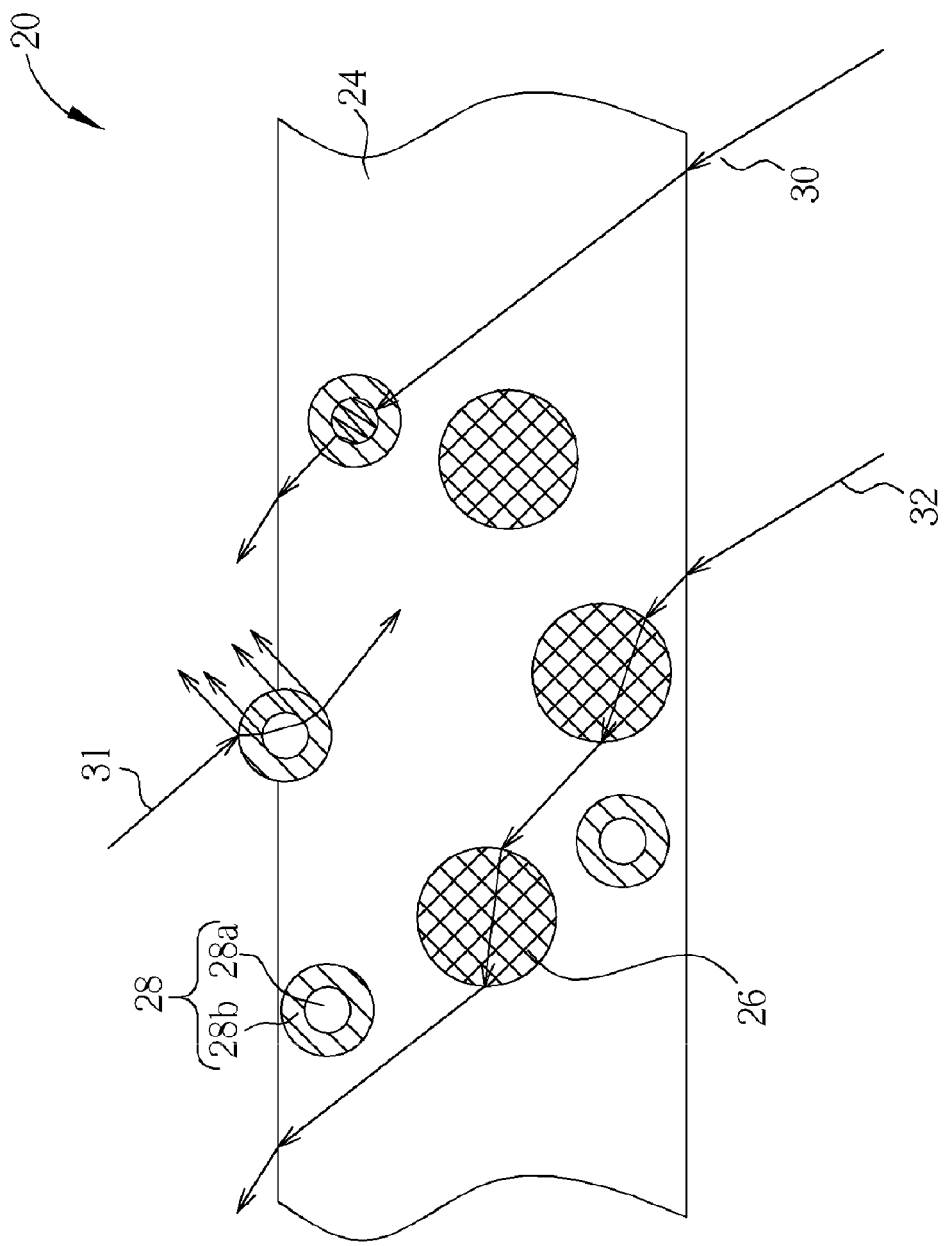
FIG. 3 is a schematic diagram showing light beam propagation in the antiglare film according to the present invention.

FIG. 3 is a schematic diagram showing the light beam propagation in the antiglare film 20 according to the present invention. As shown in FIG. 3, the hollow particles 28 are easily suspended near the upper surface of the transparent resin layer 24, since the hollow particles 28 are hollow structures with lower densities. When light beams are emitted onto the antiglare film 20 from the ambient environment (from the outside to the inside of the product), some hollow particles 28 exposed from the surface of transparent resin layer 24 can cause optical effects, such as scatterings, diffractions, and/or multiple reflections, and result in diffusions of the external light. Since the density of the solid particles 26 can therefore lager than that of the hollow particles 28, most of the solid particles 26 are usually suspended or subside in the transparent resin layer 24. In addition to the positions of the solid particles 26, since the refractive index of the solid particles 26 can lager than that of the cured transparent resin layer 24, the light beams penetrating into the antiglare film 20 from the attaching substrate 22 (from the inside of the product) can be refracted and/or be reflected many times, and this effectively result in diffusions of the internal light. The light beams 30 and 32 enter the transparent resin layer 24 from the substrate 22 (not shown) respectively. The light beam 30 encountering the hollow particle 28 is first refracted as passing the shell part 28b, subsequently reflected many times in the hollow part 28a, next refracted again as passing the shell part 28b, and thereafter scattered to the ambient environment. The light beam 32 passing through the solid particle 26 can be refracted twice by the solid particle 26, and next is scattered to the ambient environment. The light beam 31 enters the hollow particle 28 from the ambient environment, and can be partially reflected with different reflection angles and refraction angles at the interface between the hollow particle 28 and the ambient environment and at the interface within the hollow particle 28. Therefore, the antiglare film of the present invention offers both proper external light diffusions and proper internal light diffusions to achieve a great antiglare effect, a high contrast and a high clarity. In addition, only small amounts of the hollow particles and of the solid particles are needed to achieve the great antiglare effect.

Figure 4:
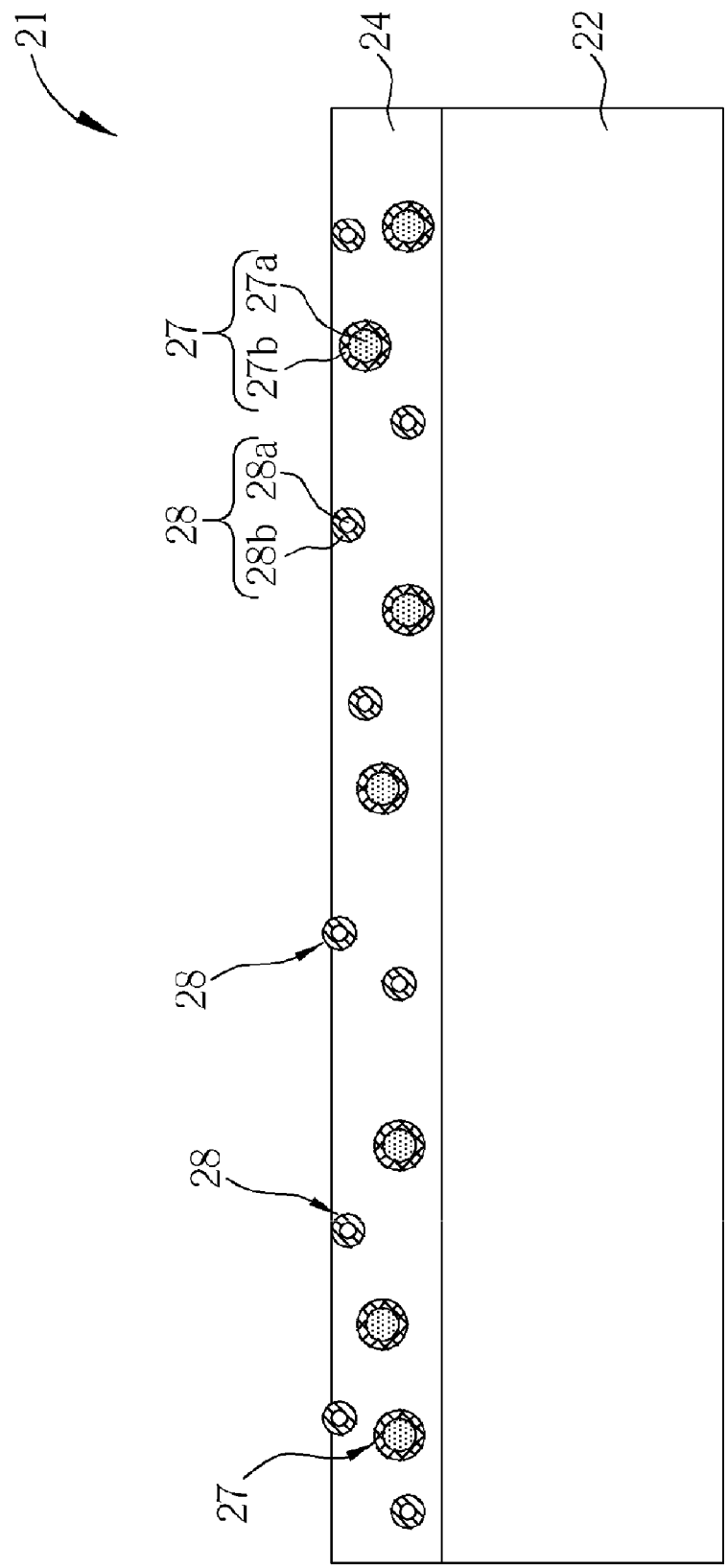
FIG. 4 is a schematic cross-sectional view of an antiglare film according to another preferred embodiment of the present invention.

In other embodiment, each solid particle can be a complex structure. FIG. 4 shows a schematic cross-sectional view of an antiglare film 21 according to another preferred embodiment of the present invention, where like numbered numerals designate similar or the same parts, regions or elements. As shown in FIG. 4, a substrate 22 is covered with an antiglare film 21. The antiglare film 21 includes a cured transparent resin layer 24, a plurality of transparent solid particles 27 and a plurality of transparent hollow particles 28. Each solid particle 27 can include a core part 27a and a shell part 27b surrounding the core part 27a. The diameter of the core part 27a can be substantially within a range from 0.5 µm to 8 µm, the outside diameter of the solid particle 27 can be substantially within a range from 1 µm to 10 µm, and should not be limited thereto. The core part 27a and the shell part 27b can include an acrylic resin, polystyrene, an acrylic-carbonate copolymer, a copolymer thereof, a derivative thereof, a mixture thereof, or an inorganic oxide compound. Preferably, the material of the core part 27a can be different from that of the shell part 27b, so the refractive index of the core part 27a can be smaller than that of the shell part 27b. The core part 27a of the solid particle 27 can even be consisted of gas or gases.

The antiglare film of the present invention can be used on the surface of various displays of, for example, computers, televisions, or automobile instruments, especially preferred on high fine display devices, but not limited thereto. For general antiglare films, the haze values are usually in a range from 3 to 90. As for the present invention, the amount of the solid particles and the amount of the hollow particles can be adjusted according to their material species, material properties, particle size, inside and outside diameters, and the desired haze value. Moreover, the antiglare film according to the present invention can be first made in a form of a cured film, and is thereafter attached to a substrate, such as a polarizing sheet of a display device, to achieve the antiglare effect, or can be directly formed on the substrate through coating and curing a pre-made antiglare coating solution on the substrate to achieve the antiglare effect.

Figure 5:
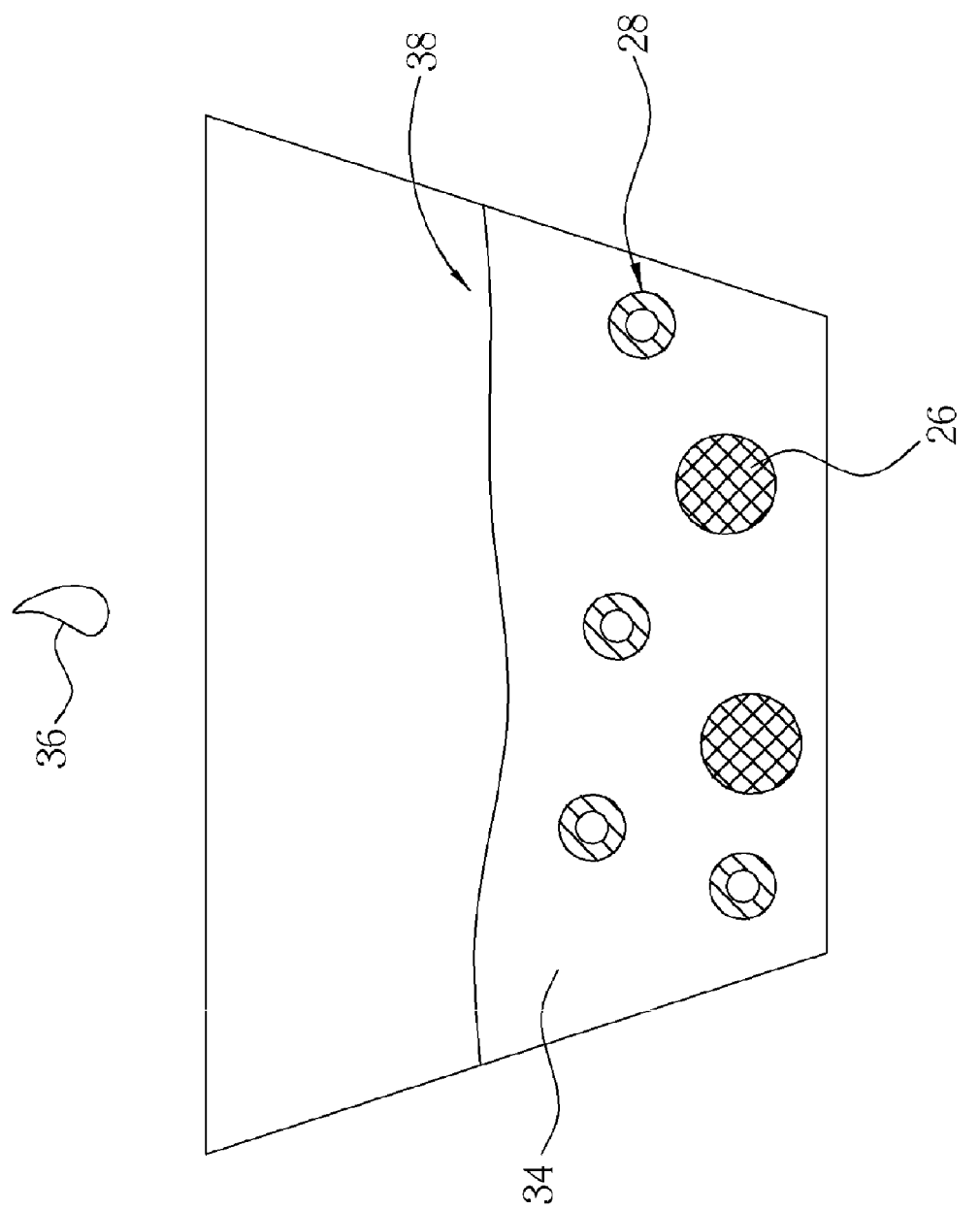
FIG. 5 and FIG. 6 are schematic diagrams illustrating a method of forming an antiglare film according to a preferred embodiment of the present invention.
Figure 6:
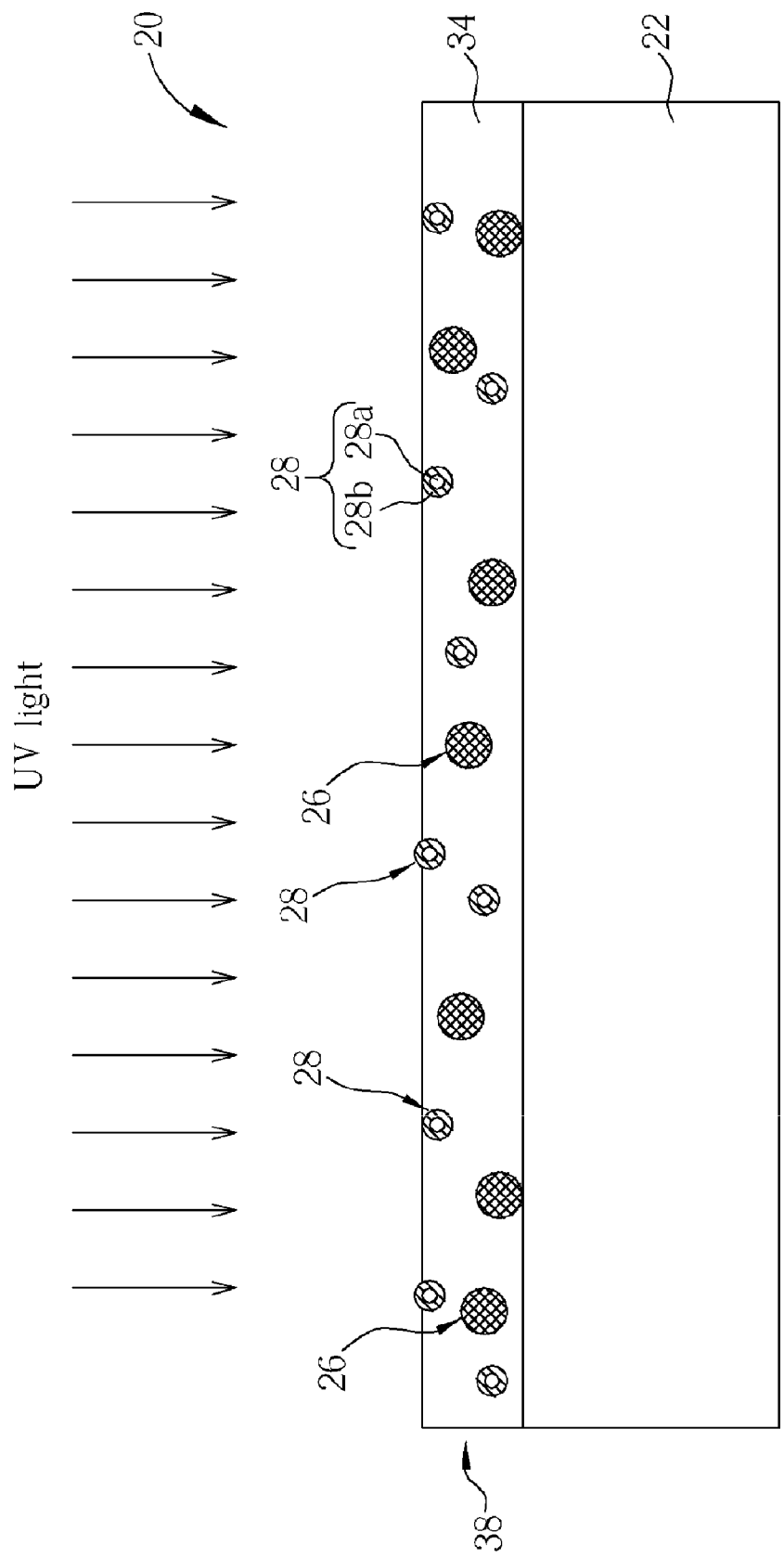

The present invention further provides a method to make an antiglare film, such as the said antiglare film 20. FIG. 5 and FIG. 6 show schematic diagrams of a method for forming the antiglare film 20. As shown in FIG. 5, a resin coating solution 34 is first provided. A solvent 36 can be optionally added into the resin coating solution 34 to adjust the properties of the resin coating solution 34, such as the contained percentage of the resin or the viscosity. For example, the solvent 36 can be added to make the solid content of the resin coating solution 34 be less than or equal to 65%. Subsequently, a plurality of solid particles 26 and a plurality of hollow particles 28 are added into the resin coating solution 34, and next are uniformly stirred to form an antiglare coating solution 38, where the solid particles 26 and the hollow particles 28 are transparent. The solvent 36 is preferred volatile, so it can be removed through evaporation during the process of coating and curing. For instance, a volatile solvent 36 can include methyl ethyl ketone (MEK), toluene, or ethyl acetate.

Thereafter, as shown in FIG. 6, the antiglare coating solution 38 is spread on a transparent substrate 22. The hollow particles 28 can float on and partially exposed from the resin coating solution 34, since the density of the hollow particles 28 can be less than that of the resin coating solution 34. Next, a curing process is performed to turn the resin coating solution 34 into a transparent resin layer so that an antiglare film 20 is formed. The curing process can include a baking step and an irradiating step. In the baking step, the substrate 22 covered with the antiglare coating solution 38 is disposed in an oven for drying. Next, the antiglare coating solution 38 is exposed to ultraviolet (UV) light in the irradiating step for solidifying, and the antiglare film 20 according to the present invention is therefore formed. The solid particles 26 in the above-mentioned method can be replace by the solid particles 27 for forming the antiglare film 21.

Some examples are described hereinafter to detail the fabrications and structures of the antiglare film according to the present invention and compared with comparative examples.

EXAMPLE

Example 1

100 parts by weight of UV curable resin U4690-MP (the name of a trade product, produced by LIDYE CHEMICAL CO., LTD, with a solid content of about 65%) was diluted in MEK solvent to form a coating solution with a solid content of about 50%. 2 parts by weight of polystyrene hollow particles (trade product SX8782 (P), produced by JAPAN SYNTHETIC RUBBER CORPORATION, with an average particle size of about 1 μm), and 1 part by weight of solid particles (consisting essentially of an acrylic-carbonate copolymer, trade product SX8706 (P), produced by Japan Synthetic Rubber Corporation, with an average particle size of about 3.5 μm) were added and stirred to disperse in the UV curable resin, thereby obtaining an antiglare coating solution. The coating solution was applied on an 80 μm-thick TAC transparent substrate (produced by FUJI PHOTO FILM CO., LTD), and the resultant was placed in an 80° C. air circulating oven to dry for about 1 minute. Thereafter, the resultant was irradiated with a UV light having a dose of 540 mJ/cm$^2$, to form an antiglare film of the present invention.

Example 2

100 parts by weight of UV curable resin (U4690-MP) was diluted in MEK solvent to form a coating solution with a solid content of about 50%. 2 parts by weight of polystyrene hollow particles (SX8782 (P), with an average particle size of about 3.5 μm), and 0.5 part by weight of polystyrene solid particles (trade product XX-03GL, produced by SEKISUI PLASTICS CO., LTD., with an average particle size of about 3.5 μm) were added and stirred to disperse in the UV curable resin, thereby obtaining an antiglare coating solution. The coating solution was applied on an 80 μm-thick TAC transparent substrate (produced by FUJI PHOTO FILM CO., LTD), and the resultant was placed in an 80° C. air circulating oven to dry for about 1 minute. Thereafter, the resultant was irradiated with a UV light having a dose of 540 mJ/cm$^2$, to form an antiglare film of the present invention.

Comparative Example 1

100 parts by weight of UV curable resin (U4690-MP) was diluted in MEK solvent to form a coating solution with a solid content of about 50%, and 3 parts by weight of polystyrene hollow particles (SX8782 (P)) with an average particle size of about 1 μm was added and stirred to disperse in the UV curable resin. The resultant coating solution was applied on an 80 μm-thick TAC transparent substrate (produced by FUJI PHOTO FILM CO., LTD), and then placed in an 80° C. air circulating oven to dry for about 1 minute. Thereafter, the resultant was irradiated with a UV light in a dose of 540 mJ/cm$^2$, to form an antiglare film.

Comparative Example 2

100 parts by weight of UV curable resin (U4690-MP) was diluted in MEK solvent to form a coating solution with a solid content of about 65%, and 3 parts by weight of an acrylic-carbonate copolymer solid particles (SX8706 (P)) with an average particle size of about 3.5 μm was added and stirred to disperse in the above resin. The resultant coating solution was applied on an 80 μm-thick TAC transparent substrate (produced by FUJI PHOTO FILM CO., LTD), and then placed in an 80° C. air circulating oven to dry for about 1 minute. Thereafter, the resultant was irradiated with a UV light in a dose of 540 mJ/cm$^2$, to form an antiglare film.

Figure 8:
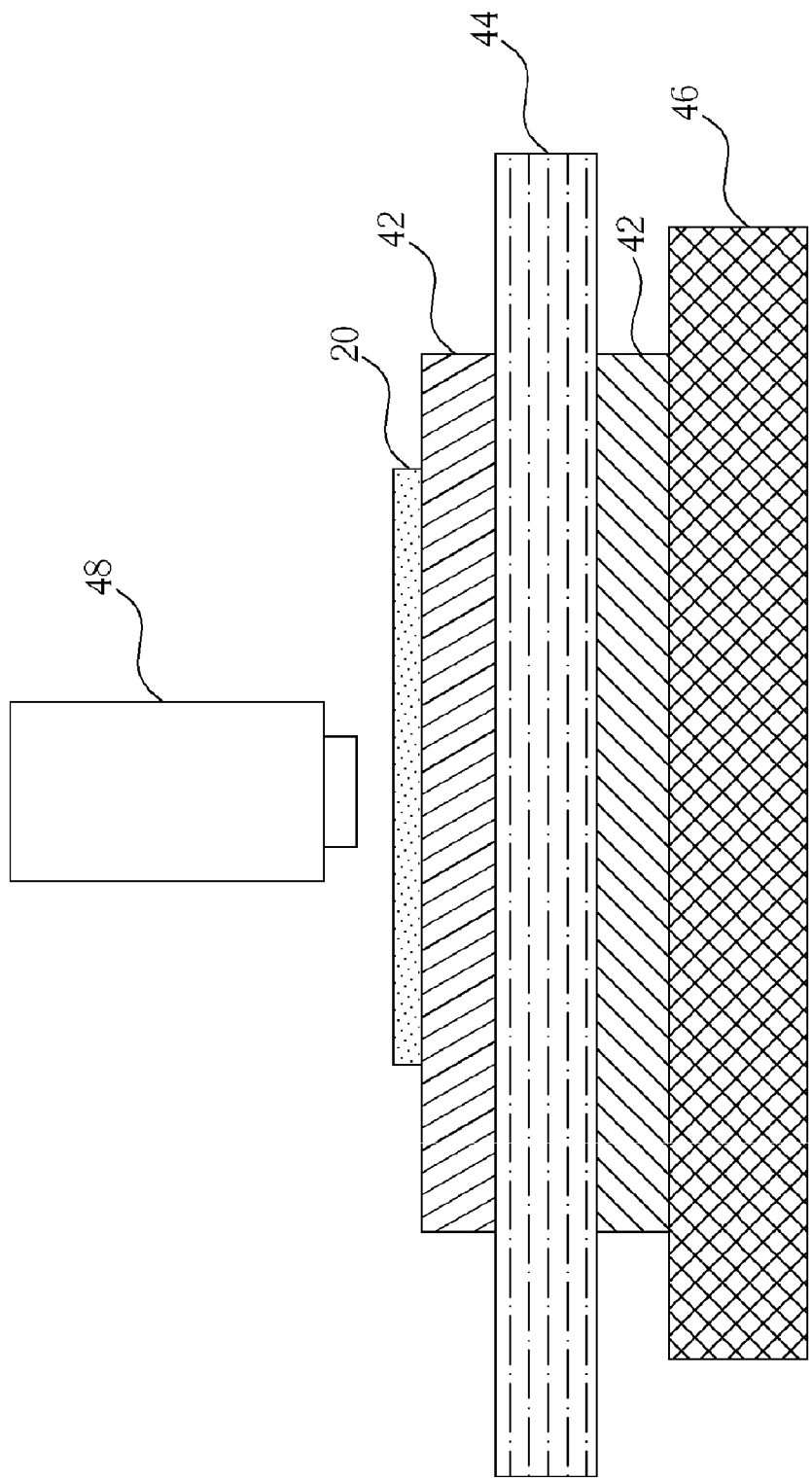
FIG. 8 is a schematic diagram illustrating the method of measuring the contrast ratio value (C/R value) of an antiglare film.

The test results of the antiglare films according to Example 1, Example 2, Comparative Example 1 and Comparative Example 2 are listed in the data table shown in FIG. 7. The total haze, inner haze and transmittance values was tested in accordance with the method specified in Japanese Industrial Standard JIS K 7361, the gloss was tested in accordance with the method specified in Japanese Industrial Standard JIS Z 8741, and the clarity was tested in accordance with the method specified in Japanese Industrial Standard JIS K 7105. In addition, the C/R value was tested in accordance with the following method. As shown in FIG. 8, the antiglare film 20 waiting for testing is well attached to a polarizing sheet 42, and thereafter the polarizing sheet 42 with the antiglare film 20 is attached to a display penal 44. The adopted display penal 44 has a resolution of 1366×768 (wide extended graphics array, WXGA), a pixel pitch of 0.511 millimeters, a C/R value of 1500, and a back light module 46 is disposed behind the display penal 44. Subsequently, the contrast analysis of the antiglare film 20 is carried out through an optical instruments 48 (EZcontrast XL88W, produced by ELDIM). According to the testing data shown in FIG. 7, the antiglare film including both the hollow particles and the solid particles (Example 1 and Example 2) have superior haze values, C/R values and clarity than the antiglare film including only the hollow particles (Comparative Example 1), and the antiglare film including only the solid particles (Comparative Example 2).

Methods of forming antiglare films according to the present invention, and optical tests on the formed antiglare films are carried over and over to testify the present invention. Accordingly, a total haze value of the antiglare film can be substantially in a range from 3% to 25%; a contrast value of the antiglare film can be substantially within a range from 800 to 5000; a 60° gloss value of the antiglare film can be substantially between 40% and 90%; an outer haze value of the antiglare film can be substantially between 0 and 6%, preferably between 4.5% and 5.5%; and a clarity value of the antiglare film can be substantially within a range from 100 to 300, preferably larger than 150. As the antiglare film of the present invention has a clarity value larger than 150, the antiglare film is suitable for using in a high fine display device. For example, a high fine polarizing sheet has the antiglare effect can be formed through adopting the antiglare film of the present invention on a polarizing sheet as a surface treating layer.

Since the hollow particles of the present antiglare film can enhance the external light diffusion, and the solid particles of the present antiglare film can enhance the internal light diffusion, the antiglare film of the present invention can have an excellent antiglare property, a high contrast and a great clarity. Thus, the display device adopting the antiglare film of the present invention not only can provide a proper antiglare effect, but also ensure a desirable display quality with a high contrast and a great clarity.

Those skilled in the art will readily observe that numerous modifications and alterations of the device and method may be made while retaining the teachings of the invention.

What is claimed is:

1. An antiglare film, comprising:
   a transparent resin layer;
   a plurality of solid particles distributed in the transparent resin layer, being transparent, wherein a refractive index of the solid particles is different from a refractive index of the transparent resin layer; and
   a plurality of hollow particles distributed in the transparent resin layer, partially exposed from the transparent resin layer, being transparent, wherein a refractive index of the hollow particles is different from the refractive index of the transparent resin layer, and a total haze value of the antiglare film is between 3% and 25% by mixing the solid particles and the hollow particles.

2. The antiglare film of claim 1, wherein a weight percentage of the solid particles is between 0.1% and 5% in the antiglare film.

3. The antiglare film of claim 1, wherein a weight percentage of the hollow particles is between 0.1% and 5% in the antiglare film.

4. The antiglare film of claim 1, wherein the antiglare film is applied to a high fine display device.

5. The antiglare film of claim 1, wherein the transparent resin layer comprises a polyester resin, a polyether resin, an acrylic acid resin, an epoxy resin, an urethane resin, an alkyd resin, a spiro acetal resin, a polythiol-polyene resin, a polybutadiene resin, or a mixture thereof.

6. The antiglare film of claim 1, wherein the hollow particles comprise an acrylic resin, polystyrene, an acrylic-styrene copolymer, a polycarbonate, or a mixture thereof.

7. The antiglare film of claim 1, wherein each of the solid particles includes a core part and a shell part surrounding and covering the core part.

8. The antiglare film of claim 1, wherein the solid particles comprise an acrylic resin, polystyrene, an acrylic-carbonate copolymer, a copolymer thereof, a derivative thereof, a mixture thereof, or an inorganic oxide compound.

9. The antiglare film of claim 1, wherein the refractive index of the hollow particles and the refractive index of the solid particles are smaller than 1.65 and larger than the refractive index of the transparent resin layer, and the refractive index of the transparent resin layer is larger than 1.45.

10. The antiglare film of claim 1, wherein a hollow ratio of each of the hollow particles is between 20% and 90%.

11. The antiglare film of claim 1, wherein a ratio of an outside diameter of each of the hollow particles to the thickness of the transparent resin layer is within a range from 0.15 to 1.

12. The antiglare film of claim 1, wherein a ratio of a diameter of each of the solid particles to the thickness of the transparent resin layer is within a range from 0.15 to 1.

13. The antiglare film of claim 1, wherein a contrast value of the antiglare film is within a range from 800 to 5000.

14. The antiglare film of claim 1, wherein a clarity value of the antiglare film is within a range from 100 to 300.

15. A method of forming an antiglare film, comprising:
   providing a resin coating solution;
   adding a plurality of solid particles and a plurality of hollow particles into the resin coating solution to form an antiglare coating solution, wherein the solid particles and the hollow particles are transparent;
   spreading the antiglare coating solution on a transparent substrate; and
   performing a curing process to turn the resin coating solution into a transparent resin layer so as to form an antiglare film, wherein the total haze value of the antiglare film is between 3% and 25%.

16. The method of claim 15, wherein a weight percentage of the solid particles is between 0.1% and 5% after the curing process.

17. The method of claim 15, wherein a weight percentage of the hollow particles is between 0.1% and 5% after the curing process.

18. The method of claim 15, wherein the antiglare film is applied to a high fine display device.

19. The method of claim 15, wherein the transparent substrate comprises triacetyl cellulose (TAC).

20. An antiglare film, comprising:
   a transparent resin layer;
   a plurality of solid particles distributed in the transparent resin layer, being transparent, wherein a refractive index of the solid particles is different from a refractive index of the transparent resin layer; and
   a plurality of hollow particles distributed in the transparent resin layer, partially exposed from the transparent resin layer, being transparent, wherein a refractive index of the hollow particles is different from the refractive index of the transparent resin layer, and a 60° gloss value of the antiglare film is between 40% and 90% by mixing the solid particles and the hollow particles.

21. An antiglare film, comprising:
   a transparent resin layer;
   a plurality of solid particles distributed in the transparent resin layer, being transparent, wherein a refractive index of the solid particles is different from a refractive index of the transparent resin layer; and
   a plurality of hollow particles distributed in the transparent resin layer, partially exposed from the transparent resin layer, being transparent, wherein a refractive index of the hollow particles is different from the refractive index of the transparent resin layer, and a outer haze value of the antiglare film is between 0 and 6% by mixing the solid particles and the hollow particles.

22. An antiglare film, comprising:
a transparent resin layer;
a plurality of solid particles distributed in the transparent resin layer, being transparent, wherein a refractive index of the solid particles is different from a refractive index of the transparent resin layer; and
a plurality of hollow particles distributed in the transparent resin layer, partially exposed from the transparent resin layer, being transparent, wherein a refractive index of the hollow particles is different from the refractive index of the transparent resin layer, and a clarity value of the antiglare film is larger than 150 by mixing the solid particles and the hollow particles.

* * * * *